United States Patent [19]

Hyde et al.

[11] 4,270,586
[45] Jun. 2, 1981

[54] CONTINUOUS FELLING OF TREES

[75] Inventors: Bruce Hyde; Wayne Tyndall, both of Prince Albert, Canada

[73] Assignee: Prince Albert Pulpwood Ltd., Saskatchewan, Canada

[21] Appl. No.: 780,043

[22] Filed: Mar. 22, 1977

[51] Int. Cl.³ .......................................... A01G 23/08
[52] U.S. Cl. ......................... 144/309 AC; 144/34 R
[58] Field of Search ............... 144/34 A, 34 B, 34 R, 144/309 AC; 30/379

[56] References Cited

U.S. PATENT DOCUMENTS

| 2,462,314 | 2/1949 | Fuqua | 144/34 A |
| 2,662,561 | 12/1953 | Duncan | 30/379 |
| 3,659,635 | 5/1972 | Mellgren | 144/3 D |

FOREIGN PATENT DOCUMENTS

| 88969 | 8/1904 | Canada. | |
| 324637 | 7/1932 | Canada. | |
| 440992 | 4/1947 | Canada. | |
| 449089 | 6/1948 | Canada. | |
| 451280 | 9/1948 | Canada. | |
| 898661 | 4/1972 | Canada | 144/34 A |

Primary Examiner—Jimmy C. Peters
Attorney, Agent, or Firm—Biebel, French & Nauman

[57] ABSTRACT

This invention is directed to a method and apparatus for continuously felling trees to be used ultimately for lumber, pulp wood, and the like. The method comprises moving a tree cutting means through a stand of trees in such a manner that the trees will fall in a rearwardly direction relative to the direction of travel of the tree cutting means through the stand of trees. The apparatus comprises a tree cutting means and a means such as a power wagon for moving the cutting means through the stand of trees at a rate whereby the trees topple in the desired substantially parallel pattern.

2 Claims, 7 Drawing Figures

CONTINUOUS FELLING OF TREES

BACKGROUND OF THE INVENTION

This invention is directed to a method and apparatus for continuously felling trees, and more particularly to a method of continuously felling trees by using a horizontally disposed tree cutting mechanism mounted on a powered vehicle.

Companies engaged in the lumber and pulp and paper business for economic reasons are constantly striving to develop new methods and improve existing methods of harvesting trees from timber stands.

At present, using current mechanical harvesting methods, it is usually uneconomical to harvest trees measuring approximately four to nine inches in butt diameter that typically grow in relatively flat sometimes marshy areas located in Northern regions. The only feasible method of cutting such trees in these areas is by means of hand operated chain saws. However, this method is labor intensive, which is undesirable for the following reasons.

First, on average, it takes one man using a chain saw at least about one minute to harvest an eight inch tree. Moreover, working conditions for the chain saw operator are often uncomfortable because there is often excessive cold in the winter time, there are usually excessive biting insects and humidity in the summer time, and the chain saw operator experiences back fatigue because bending over is required to cut the trees. Further, it is necessary to pay much higher rates to piece workers in small trees for equal wood volume produced, and on day rates, less wood volume is produced for a days pay. This system of compensation favors the cutting of larger trees, and hence the smaller trees are ignored because they are unprofitable to cut. Finally, there is an increasing shortage of good manpower in the "bush" because most people now prefer to work in urban areas. As a result, many potentially useful stands of timber mainly measuring four to nine inches are not being harvested.

SUMMARY OF THE INVENTION

We have invented a low manual labor method and apparatus whereby trees measuring about four to nine inches in butt diameter, but including trees with butt diameters larger than nine inches, can be continuously and economically harvested by moving a tree cutting means mounted on a moving means, such as a powered wagon, through a stand of such trees. The trees are harvested by moving the cutting means, which can be one or more rotating horizontally disposed circular saw blades, along the edge of a stand of trees at a rate such that a swath of trees is cut and caused to fall in a parallel pattern in a rearward direction relative to the direction of travel of the moving cutting means through the stand of trees.

The cut trees can be collected into bundles of substantially parallel cut trees by using a cut tree accumulator in association with the cutting means. The trees collected by the accumulator are deposited on the ground at periodic locations along the path previously traveled by the moving cutting means. The bundles of trees can be delimbed while they are lying in the swath path, and can then be removed from the swath path by some suitable means such as a front end pick-up. Alternatively, the bundles of trees can be removed from the swath path by means such as a front end pick-up for delimbing at another site. As a further alternative, the cut trees can be assembled into large bundles (i.e. full loads) and transported to an intermediate landing or central processing point without the need of another forwarding or off-loading machine.

The moving cutting means advances through the trees at a velocity that is sufficiently high to cause the cut trees to topple in a substantially parallel manner with one another. When the cutting means is a reciprocating saw blade, it should travel at sufficient speed to cut the trees efficiently. When the cutting means is a circular saw blade, it should rotate at a rate which efficiently cuts the trees standing ahead of the swath path. A rate in the neighborhood of 900 rpm has been found satisfactory, but lower and higher rates are possible, so long as the trees are cut efficiently and cleanly so that there is minimum damage to tree butts. Various shapes, types, sizes and numbers of saw teeth can be used to suit various cutting requirements depending on types of trees to be cut, size of kerf to be cut, saw blade velocity and rate of travel of the saw through the trees. Different types of saw teeth may require different cutting speeds for optimum operation.

While we do not wish to be limited to any specific theories, it seems that in order to successfully enable continuous forward motion of cutting means through a stand of trees at a forward velocity sufficient to cause the cut trees to topple rearwardly in a substantially parallel manner the cutting means must have power sufficient that it does not lose appreciable cutting speed or forward velocity during the time it is physically cutting a particular tree. The power required to accomplish this can be substantial. A circular saw blade appears to lend itself very well to fulfilling this requirement. The rotating circular saw blade, particularly if it is of relatively heavy construction, has the ability while it is traveling from one tree to the next to store within itself substantial kinetic energy in the form of rotation or "fly wheel" energy. This stored kinetic energy can be trapped during the fraction of a second that is required by the saw to cut through the butt of a tree at the forward velocities necessary to cause the cut trees to topple rearwardly in a parallel manner.

The apparatus used for continuously felling the trees in the manner described comprises a tree cutting means, and means for moving the cutting means through the stand of trees at a rate whereby the trees topple in a substantially parallel pattern.

When the tree cutting means is one or more saws which can be disposed horizontally, the one or more saws can be connected to a cutting means mover such as a power wagon which drives the one or more saws and moves them through the stand of trees at a predetermined height above the ground. The one or more saws can be maintained at a predetermined height above the ground by any suitable means such as mounting the one or more saws on one or more skids of predetermined height, or by ground sensors, or the like. A hitherto unproven skid, which few of those skilled in the art would have thought would be successful, has surprisingly proven to be an acceptable means of holding the saws at a predetermined height. The one or more saws can be located at any suitable position on the power wagon, for example, to one side of the power wagon, and can be mounted on at least one skid. Another possible arrangement is to have the one or more saws located at the front of the power wagon with the cut trees toppling to one side of the power wagon.

The one or more saws can be pivotally connected to the power wagon by means such as a beam which permits limited vertical movement between the saw and the power wagon. The one or more saws can also be located to one side at the rear of the power wagon, if required. The type, size, arrangement and shape of the cutting teeth on the saws can be varied to suit the types of trees that are being cut and the cutting speeds of the saws.

When the tree cutting means is a rotating circular saw, it is preferable that the edge of the saw that cuts the trees is moving away from the stand of trees toward the trees in the swath path yet to be cut so that the saw does not tend to kick the butts of the cut trees into the stand of trees adjacent the swath path, thus causing the tree to fall in the opposite direction, rearwardly of the direction of the travel of the cutting means through the stand of trees. It is believed that the felling of trees so that they fall rearwardly parallel to the direction of movement of the power wagon in accordance with the present invention may in part be due to frictional engagement between the butt end of the trees after they have been sawn and some portion of the forwardly moving apparatus of the present invention, such as the saw or the skid pan covering the saw.

A cut tree collecting means such as an accumulator can also be mounted above or behind the one or more tree cutting means to collect the trees as they are cut. The accumulator can include a lifter which dislodges the cut trees from the accumulator whereby the cut trees fall on the ground in bundles of substantially parallel trees.

A skid pan can be located over the cutting means to prevent the weight of cut trees being directed on the cutting means. A tree guard can be installed on the power wagon to prevent cut trees from toppling on the power wagon.

The tree cutting method disclosed can be used on almost any terrain ranging from flat to rolling hills so long as the cutting means can be moved over the terrain to achieve the desired effect. The method, however, would not be suitable for tree bearing terrain that is so rough and uneven that it is not possible to move the cutting means by some means over the terrain. Various known mechanisms can be used above or behind the cutting means to guide the direction of fall of the cut trees and to position the cut trees for transport.

DETAILED DESCRIPTION OF THE PREFERRED EMBODIMENTS

Figure 1:
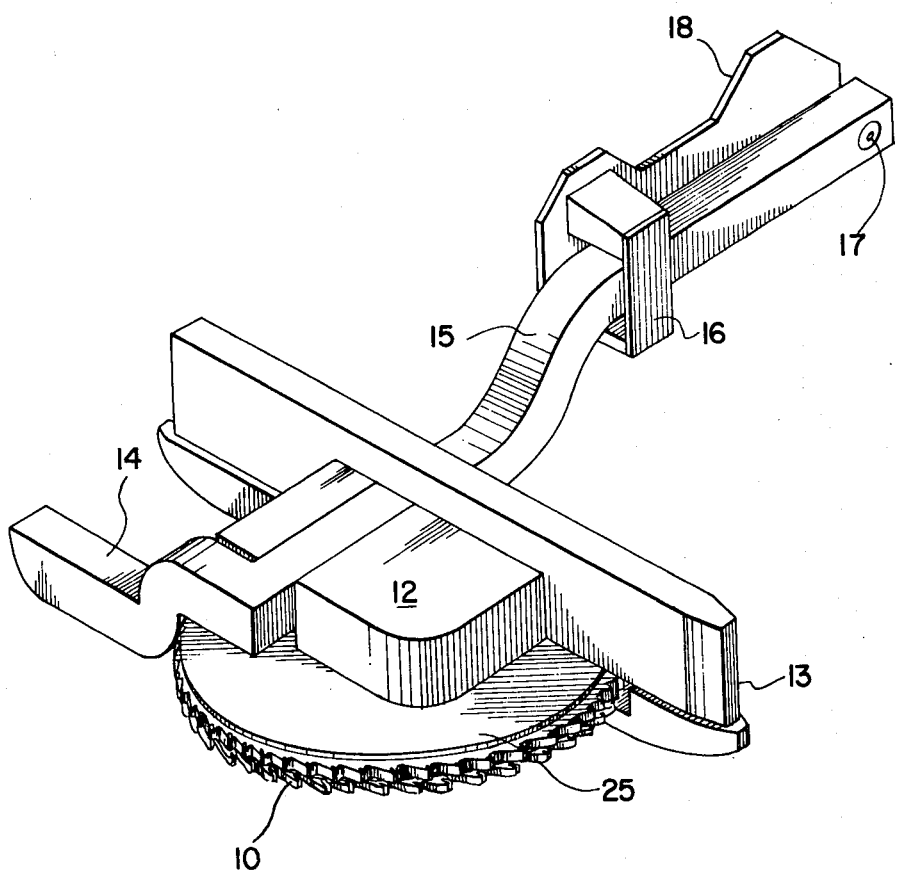
FIG. 1 is a three dimensional isometric view of the cutting blade and accessories.

Referring to FIG. 1, a circular saw blade 10 is mounted underneath a drive mechanism 12, both of which extend through the intersect with a main skid 13 and a rear skid 14. The drive mechanism 12, rather than extend through the main skid 13 as is shown, can be mounted so that it lies parallel with and alongside the main skid 13. This latter embodiment might be preferable to provide less exposure of the drive mechanism housing to the toppling cut trees. The main skid 13 and the rear skid 14, together with the saw blade 10 and the drive mechanism 12, are secured to a cross-mounting beam 15 which extends through a beam throat 16. A beam pivot 17 is mounted in the end of the cross-mounting beam 15 opposite the saw blade 10. A vertically extending front mounting plate 18 is located behind the cross-mounting beam 15.

Figure 2:
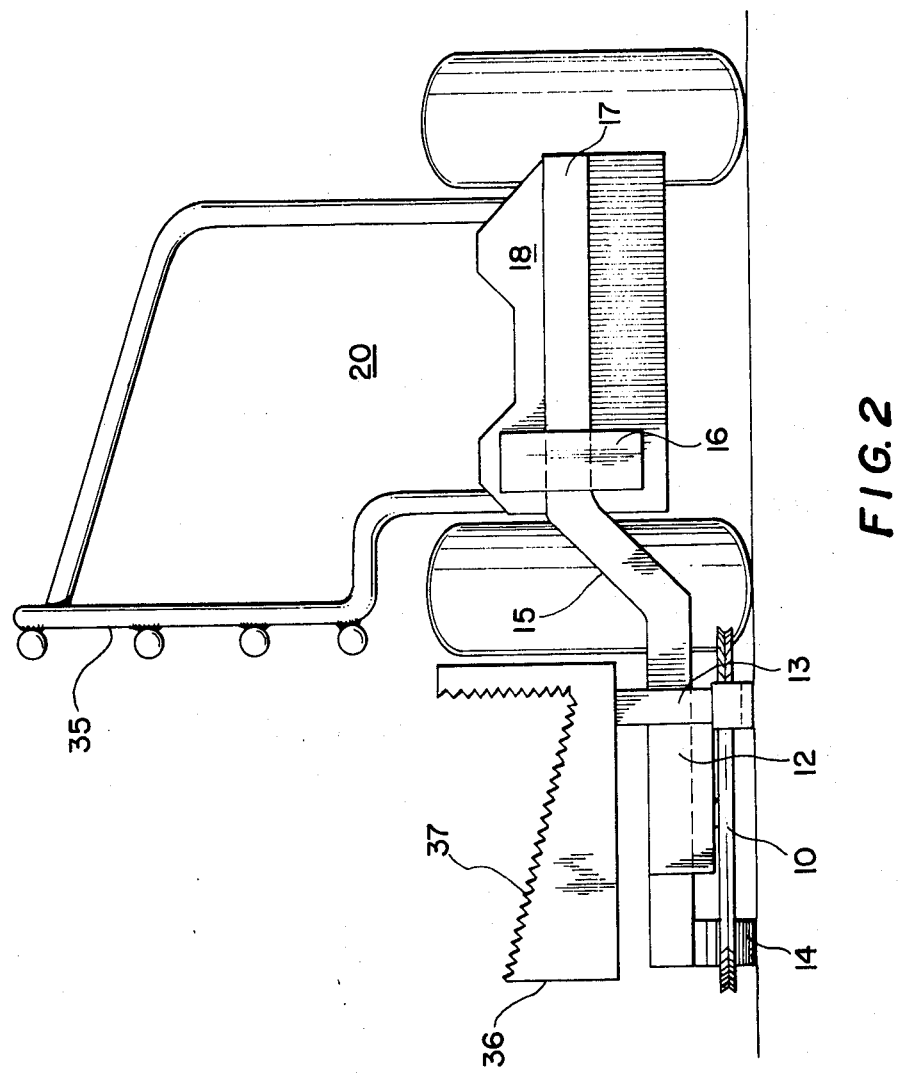
FIG. 2 is a front view showing the cutting blade mounted on a power wagon.

Referring to FIG. 2, the saw blade 10, as seen in FIG. 2, extends to the left of the power wagon 20. The main skid 13 and the rear skid 14 rest on the ground and hold the saw blade 10 a predetermined distance above the ground. The drive mechanism 12, which should have a low profile to minimize interference with cut trees, can be a crown and pinion gear mechanism hydraulically driven by power generated by the power wagon 20. The cross-mounting beam 15 extends laterally through beam throat 16 and is pivotally connected to the front end of the power wagon 20 by means of beam pivot 17.

The beam throat 16 is constructed so that cross-mounting beam 15 can pivot upwardly and downwardly a certain distance. The pivotal action of the cross-mounting beam 15 about beam pivot 17 enables a certain amount of independent movement to take place between the power wagon 20 and the saw blade 10 as these two pieces of apparatus travel along uneven terrain. One or more rollers (not shown) are mounted on the rear side of the cross-mounting beam 15 at the location where the cross-mounting beam 15 extends through the beam throat 16. This greatly reduces friction between the cross-mounting beam 5 and the beam throat 6.

The main skid 13 and the rear skid 14 ensure that the saw blade 10 will always travel a predetermined distance above the ground thereby avoiding rocks and other obstacles that might be lying on the ground. These obstacles, if contacted by the saw blade 10, would tend to dull its teeth although not all obstacles need necessarily be avoided because the rugged construction of the saw blade and teeth enable the saw to take considerable abuse short of disabling damage.

The main skid 13 can be of unitary construction, but the skid 13 shown in FIG. 1 is constructed in two sections, an upper section and a lower section. The upper section can be removed so that repairs and adjustments can be made to the drive mechanism 12 and the cross-mounting beam 15 that extend through the upper section of the main skid 13. If the drive mechanism 12 is located parallel to an alongside the main skid 13, then the skid 13 can be a unitary section because the drive mechanism 12 can be repaired without interference from the main skid 13.

Figure 3:
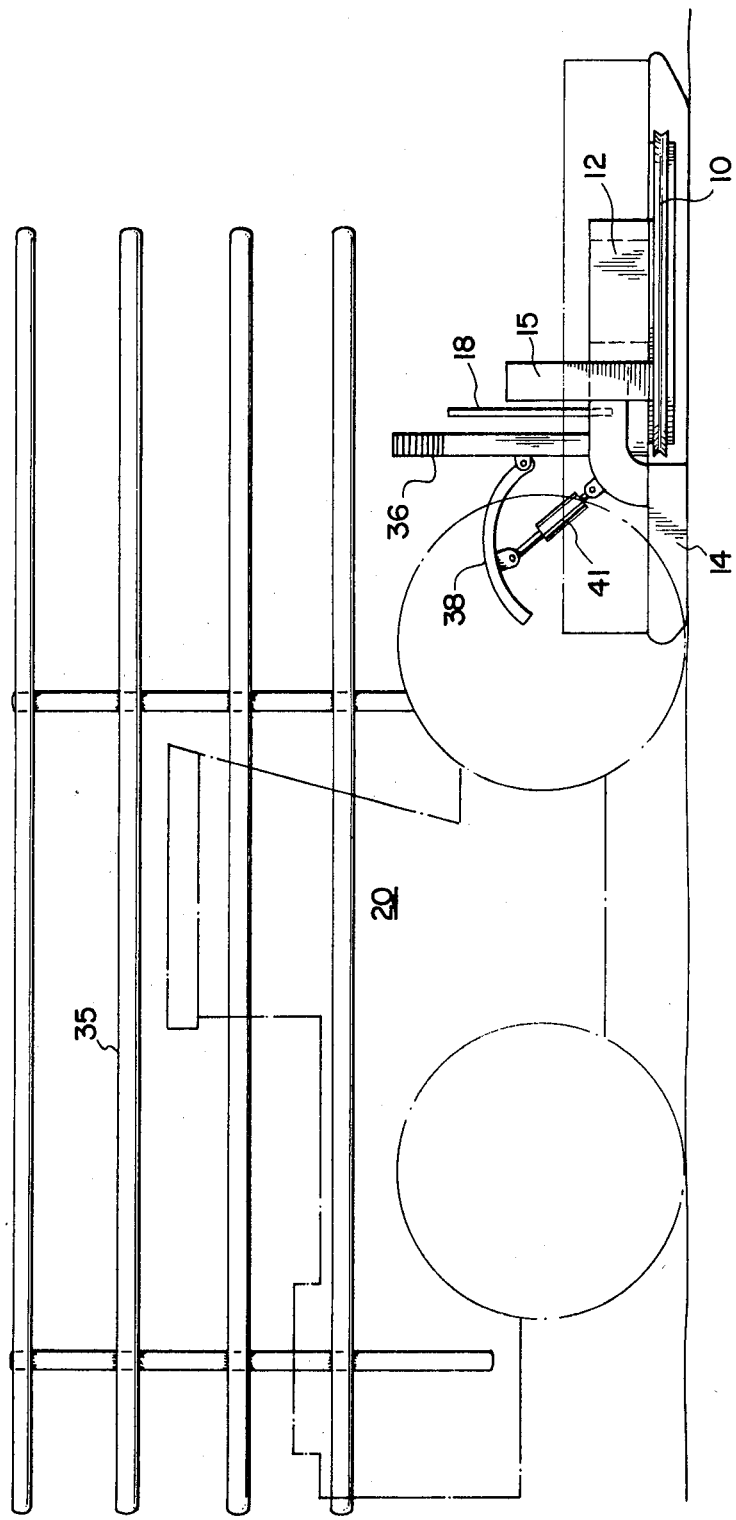
FIG. 3 is a side view showing the cutting blade mounted on the power wagon.

Referring to FIG. 3, the saw blade 10 extends forwardly and to one side of the power wagon 20. The saw blade 10 generally runs about four inches above the ground. However, to reduce binding problems caused by having the rear section of the saw blade 10 bear down on the tops of any tree stumps that have been cut by the front edge of the blade 10 as the remainder of the blade 10 passes over such stumps, the saw blade 10 can be tilted slightly in a forwardly direction so that the rear edge of the blade 10 is higher off the ground than is its front edge. The rear section of the saw blade 10 is usually about one inch higher off the ground than is the front edge.

By having the saw blade 10 tilted slightly forwardly, the non-cutting areas of the blade ride above any obstructions such as tree stumps and the like and hence do not draw unnecessary power from the power wagon 20. However, tilting the saw blade forwardly slightly is optional and may not be either necessary or desirable in many situations. The front mounting plate 18 is mounted at the front of the power wagon 20 and provides a mounting means for the throat 16 and pivot 17, and also provides the front end of the power wagon 20 protection from falling trees, branches, and the like.

Figure 4:
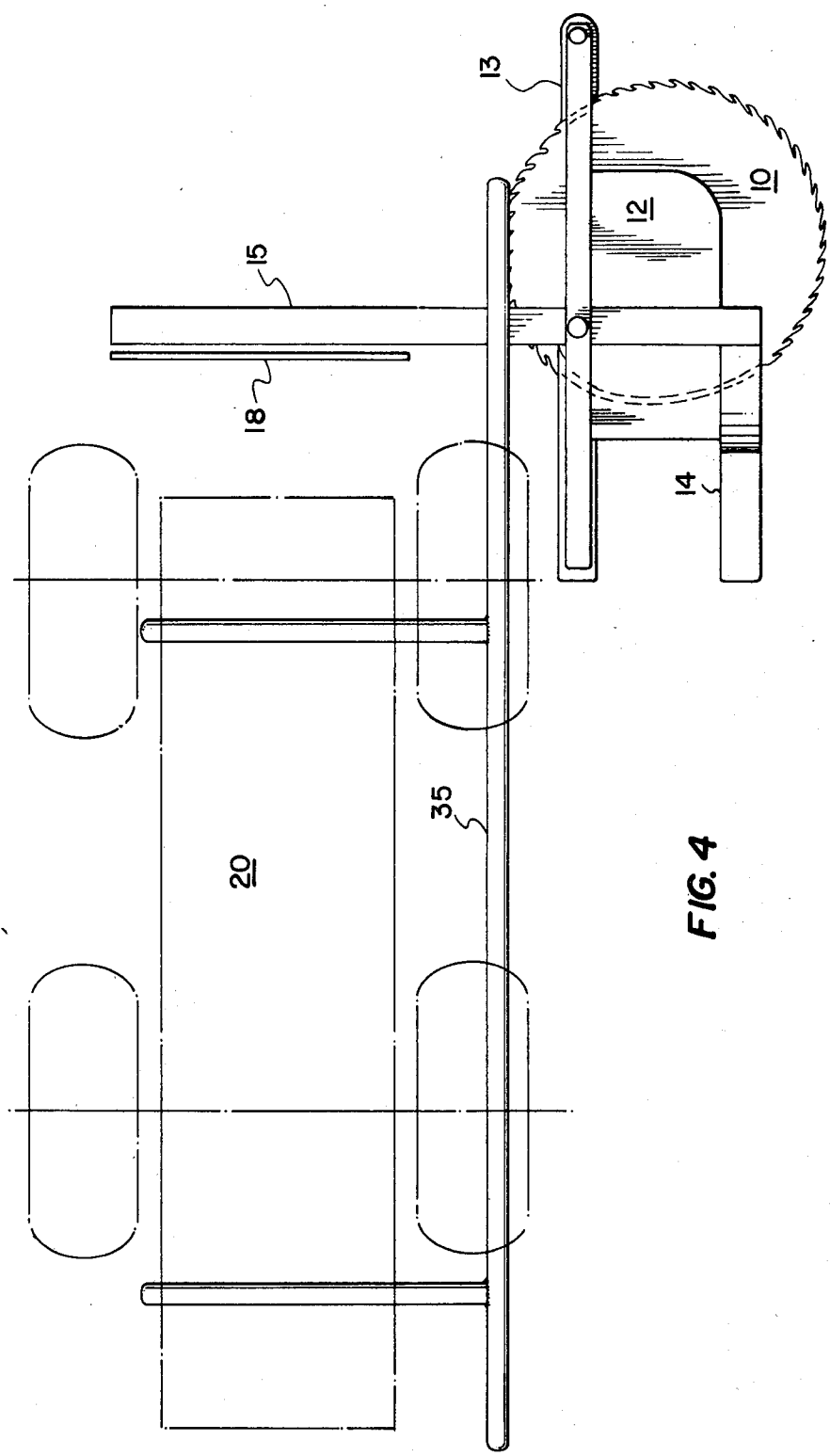
FIG. 4 is a top view showing the cutting blade mounted on the power wagon.

Referring to FIG. 4, the saw blade 10 extends to the front and side of the power wagon 20. The advantage of mounting the saw blade 10 in this position in association with the power wagon 20 is that as fresh trees are cut at a certain rate, they tend to fall rearwardly in a direction more or less parallel with the direction of travel of the power wagon, and along the side thereof. In this way, the power wagon does not run over the cut trees. It will be appreciated, of course, that mounting the saw blade 10 at other locations on the power wagon 20, for instance at the front center with the cut trees being directed to one side, or at the rear and one side thereof, is possible.

Various constructions of cut-tree positioning devices can be mounted on the power wagon 20 to assist in guiding the direction of the falling trees and collecting them for easy and economical handling.

By using the horizontally disposed saw blade 10 and power wagon 20 combination, it has been found that by having the saw blade 10 with the type of saw teeth described rotate in a counterclockwise manner at a speed of about 900 r.p.m. and having it advance through a stand of trees at a sufficient speed, the trees cut by the saw blade 10 will fall rearwardly and alongside of the power wagon 20 in a substantially parallel manner. A speed of at least two miles per hour should be successful. Lower or higher saw blade speeds might be found to give better performance in combination with other sizes and arangements of was teeth.

Having the cut trees fall in a more or less parallel manner facilitates gathering the cut trees for carting away to a desired location. Falling tree guiding devices can be used to improve the efficiency of the procedure. The cut trees can be delimbed by a standard tree delimber, such as a flail, either while they are lying in a substantially parallel manner on the swath path, or at another location after they have been removed from the swath path.

It has been found under the conditions described that if the saw blade 10 is advanced through the trees at a speed significantly less than two miles per hour, the cut trees tend to fall more or less in a random manner. Some trees tend to fall in front of the power wagon 20 and are broken by being run over by the power wagon 20. Other cut trees tend to fall inwardly into the stand of trees. Accordingly, collecting these trees is difficult and the cost becomes prohibitive.

Cutting the trees at a rate of greater than about two miles per hour is possible, because at such speeds the cut trees still tend to topple rearwardly in a substantially parallel manner, but it has been found under the conditions described that at speeds of substantially over about two miles per hour, it is difficult for the operator of the power wagon 20 to hold the power wagon and the cutting blade 10 on a reasonably straight path, particularly if the power wagon is moving over uneven grounds.

Even relatively flat ground, however, has bumps and the like, which must be negotiated by the power wagon. Uneven terrain makes it difficult for the operator to guide the cutting blade 10 so that an even swath of trees is cut and the cutting blade cuts down all trees in the swath. If the cutting blade penetrates too deeply into the stand of trees, for example, and fails to cut down a tree located at the edge of the stand of trees, then if the tree is of sufficient size it becomes an obstacle standing in the path of the power wagon 20, and the power wagon must back up so that the tree can be cut.

Of course, if the terrain is reasonably flat, then the trees can be cut at substantially greater rates. At substantially greater speeds, the cut trees still tend to topple rearwardly in a substantially parallel manner, and under proper conditions, probably there is no upper limit to the rate at which the trees can be cut to cause them to fall rearwardly in a substantially parallel manner. The upper limit is probably governed only by the point where it becomes impossible or impractical to control the cutting means, the power wagon, or manage the volume of trees cut.

Figure 5:
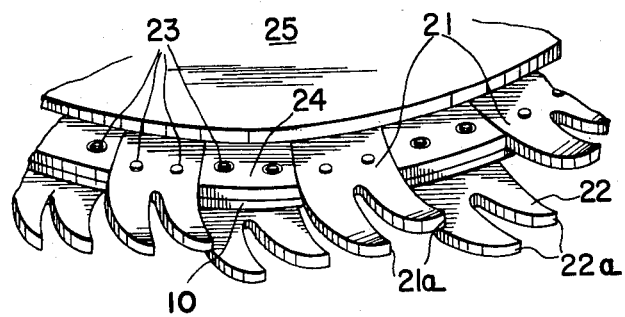
FIG. 5 is a detailed perspective view of a cutting blade showing the saw teeth.

Referring to FIG. 5, alternating upper saw teeth 21 and lower saw teeth 22 are distributed around the circumference of the saw blade 10. The upper saw teeth 21 and the lower saw teeth 22 each have two cutting edges 21a and 22a, respectively.

The upper saw teeth 21 are located on and secured to the top of the saw blade 10 by means of saw teeth bolts 23. However, other suitable means of affixing the saw teeth 21 to the saw blade 10 can be used. It is helpful to have the teeth detachable because they can then be removed for sharpening and can be replaced independently.

Secured to and mounted on the underside of the saw blade 10, in positions which alternate with the upper saw teeth 21, are lower saw teeth 22. These lower saw teeth 22 are also fastened to the saw blade 10 by means of bolts 23.

When testing this construction of saw blade 10, it has been found that the bases of the cut trees sometimes tend to drop into the spaces between the regularly spaced apart upper saw teeth 21, particularly if the speed of the saw slows down significantly. The teeth thus tend to jam on the bases of the cut trees thereby causing an unnecessary power draw and slowing the saw further. Accordingly, to prevent the bases of the cut trees from dropping between the spaced apart upper saw teeth 21, spacers 24 of the same thickness as the saw teeth 21 are located between each of the upper saw teeth 21. These spacers 24 are also fastened to the saw blade 10 by means of bolts 23 although other suitable fastening means can be used. The spacers 24 enable the upper saw teeth 21 to move smoothly under the bases of the cut trees thereby minimizing any unnecessary power draw. The spacers 24 also seem to assist in guiding the butts of the cut trees forward.

To prevent the trees, once they have been cut by the upper and lower saw teeth, from dropping onto and binding on the top surface of the saw blade 10, thereby creating unnecessary friction and unnecessary power draw, a protective circular skid pan 25 is mounted above the top surface of the saw blade 10. The skid pan 25 is dimensioned so that the circumference thereof extends almost to the rear edges of the upper saw teeth 21, and the width thereof is sufficient to provide a smooth line in elevation with the top surface of the upper saw teeth 21.

The bases of the cut trees, as the saw blade 10 advances through the trees, thus rest briefly on the top surface of the upper saw teeth 21 and the spacers 24, and thereafter rest for a short period of time on the top surface of the skid pan 25, before the cut trees topple rearwardly. The distance between the circumferential edge of the skid pan 25, and the rear edges of the upper saw teeth 21 should be minimal to prevent sawdust, dirt and the like from collecting in the spaces between the skid pan 25 and the saw blade 10.

Figure 6:
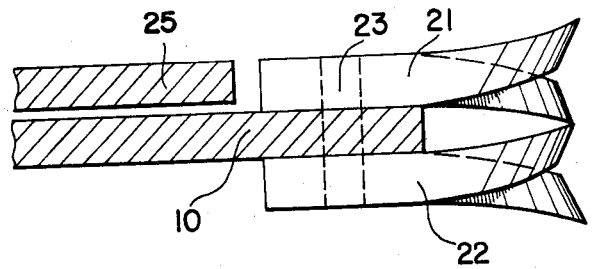
FIG. 6 is a side view partly in section of the cutting blade with upper and lower saw teeth mounted thereon.

Referring to FIG. 6, the upper saw teeth 21 are mounted on the top surface of the saw blade 10. One of the two cutting edges on each of the upper saw teeth 21 bends upwardly, while the other cutting edge bends downwardly. Similarly, with the lower saw teeth 22, one of the two cutting edges bends upwardly while the other cutting edge bends downwardly. The advantage of this construction of upper and lower saw teeth is that a continuous vertical face of cutting edges is presented to the trees by the rapidly rotating saw blade 10. The dimensions of the upper and lower saw teeth 21 and 22 can be varied to accomodate assorted requirements, but the construction shown in FIG. 6 is usally sized to cut a kerf through the trees of about two and three quarter inches. It has been found that cutting a kerf of about two and three quarter inches through trees measuring from four inches to ten or more inches in diameter does not require unreasonably high power.

Other shapes, types, sizes and numbers of saw teeth can be used to suit various cutting reguirements depending on types of trees to be cut, size of kerf to be cut, saw blade velocity and rate of travel of the saw through the trees.

Figure 7:
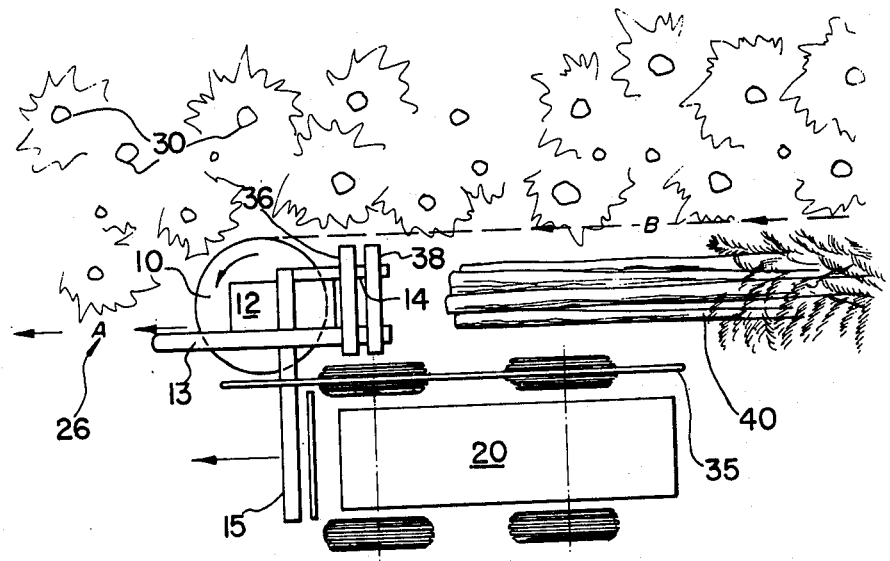
FIG. 7 is a top view of the continuous felling machine cutting a swath along the edge of a stand of trees.

Referring to FIG. 7, the saw blade 10 and the power wagon 20 are moved along the face 26 of a stand of trees 30 so that the saw blade 10 cuts about a four foot linear swath along the edge of the tree stand. The operator of the advancing power wagon 20 controls its direction so that main skid 13 moves along path A. The skid 13 must be kept to the left of the uncut trees 30, otherwise uncut trees lie directly in the path of the cross-mounting beam 15 and the drive mechanism 12, and the power wagon 20 is not able to advance, particularly if the trees are of significant size.

By driving the power wagon 20 along the path A alongside the face 26 of the uncut trees 30 at a speed of at least about two miles per hour, the cut trees tend to fall rearwardly in a substantially parallel manner which facilitates their pickup and removal to another location. Once a pass has been completed along the face 26 of the trees, and the cut trees have been removed from the swath path, the operator of the power wagon 20 makes another parallel pass along the new face of the trees (see face B in FIG. 7) cutting a second four foot swath of trees from the tree stand. Subsequent passes are made in a similar manner until the required number of trees 30 has been cut.

It will be appreciated that for the described continuous method of felling trees to function properly, the terrain must be of a type that can be negotiated by the power wagon 20 and the saw blade 10. This method of cutting trees is not feasible where the trees have grown on steep and rugged terrain. On such terrain, other methods of harvesting trees using the disclosed principle should be employed.

It has been found using the equipment described that when the saw blade 10 rotates in a counterclockwise direction (See FIG. 7) at a rate between about 700 rpm to about 1600 rpm, and is driven through the trees at a rate of at least about two miles per hour, the great majority of cut trees fall backwardly of their own accord in a substantially parallel manner. Further, any cut trees that might have a tendency to topple inwardly into the trees slide along the adjacent uncut trees thereby causing such cut trees to fall rearwardly in a line. Also, a tree guard 35 mounted on the power wagon 20 assists those cut trees that have a tendency to fall away from the uncut trees to be directed in a rearward manner. The tree guard 35 also provides protection for the power wagon 20 and the operator. Other machanical assists to guide the trees so that they fall in a preferred manner can be mounted on the power wagon.

When continuously cut in the foregoing fashion, the cut trees are relatively evenly distributed along the swath path in a substantially parallel manner. This is advantageous and is greatly preferred to having the trees fall in a more or less random manner. However, it would be even more preferable if the cut trees could be collected in parallel bunches so that more than one or two cut trees could be picked up at a time.

We have developed a method whereby the cut trees can be collected in parallel bunches which are then laid down periodically along the swath path. This is done by mounting an accumulator 36 on the main skid 13 and the rear skid 14, above the drive mechanism 12 and the cross-mounting beam 15. This accumulator 36 is shown in FIGS. 2, 3 and 7. The accumulator 36 has on the top side thereof small teeth 37 which bite into the bark of the cut trees as they topple rearwardly alongside the moving power wagon 20. The accumulator 36, by means of the accumulator teeth 37, tends to catch and hold the toppled trees so that they are dragged along the swath path for a period of time until a bunch of cut trees is collected.

Then, by means of a lifter 38, which is positioned rearwardly of the accumulator 36, and is operated on command by the operator of the power wagon 20, the collected trees are lifted off the accumulator teeth and are discharged as a bunch of substantially parallel cut trees 40 on the swath path. The lifter 38 is hydraulically operated by means of a hydraulic piston and cylinder 41 using the same power source as is used to drive the saw blade 10. Once one bunch of cut trees 40 has been dropped on the swath path, the accumulator 36 begins to collect another bunch of cut trees.

When the cut trees are distributed in parallel bunches along the swath path, it is a relatively simple operation to remove the bunches of cut trees 40 from the swath path by using a front end loader that picks up a bunch of trees at a time and carries the bunch to another location. The trees in the bunches along the swath path can be delimbed by using a flail or some other suitable delimbing means while the trees lie on the swath path, or they can be delimbed at another location after being taken to that location by the loader. The advantage of delimbing the tree bunches while they are on the swath path is that the branches are left on the swath path. This reduces the bulk of wood that must be carted away by the front end loader. We have found that one or two such front end loaders are able to keep up with the power wagon 20 and remove all of the bunches of trees from the swath path.

The lifter 38 can be any construction which is successful in lifting the collected trees off the accumulator 36 so that they can be dropped in a bunch along the swath path. We have found that a suitable lifter 38 can be constructed so that it has a semi-cylindrical shape with the axis running laterally to the power wagon 20. The lifter 38 has the convex side facing upwardly and lies parallel to and behind the accumulator 36. (See FIGS. 3 and 7). The upwardly facing convex shape is advantageous because it provides a smooth surface that does not tend to catch the cut trees. The lifter 38 is lifted by a simple hydraulic piston and cylinder 41. The hydraulic piston and cylinder 41 has sufficient power to lift the lifter 38 and the collected bunch of cut trees off the accumulator teeth 37. Then, due to the movement of the power wagon 20 and the friction caused by having the tops of the cut trees drag along the ground, the cut trees slide rearwardly over the smooth upper face of the lifter 38 and drop on the ground in a bunch.

It has been found that when temperatures are above the freezing point, the bark of the cut trees is soft, probably because the bark is full of sap. The weight of the cut trees alone causes the accumulator 36 to bite into the bark. The accumulator 36 thereby grips the cut trees as they topple rearwardly until a bunch of trees is collected and discharged by means of the lifter 38. In the winter time, however, when temperatures are below freezing, the bark of the cut trees loses its resiliency. Under these conditions, it has been found that accumulator teeth 37 (See FIG. 2) are necessary in order to enable the accumulator 36 to grip the cut trees.

The following examples are representative of actual tests that have been carried out in stands of trees measuring for the most part 4 to 9 inches in diameter at butt located north of Prince Albert, Saskatchewan, Canada.

EXAMPLE 1

A test run along the edge of a stand of trees was made using a five-foot, six-inch diameter horizontal circular cutting blade driven by a HYDRO-AX MODEL 500, which is a trademark for a small model of power wagon with relatively low power capability of 117 horsepower. The HYDRO-AX power wagon was manufactured by National Hydro-Ax, Inc., Owatonna, Minn. 55060. The saw blade had large teeth which cut a kerf through the trees of about 4½ inches. The saw blade was mounted to the right of the power wagon and driven in a counterclockwise manner.

Ten trees were cut in fourteen seconds while the power wagon travelled a distance of 45 feet. A second pass was made where 36 trees were cut in 240 seconds over a longer distance. However, there was insufficient power to maintain the saw blade at a consistent cutting speed and hence the trees were not being cut efficiently. Further, the cut trees tended to jam between the saw blade and a guard positioned between the saw blade and the power wagon. The jammed trees sometimes fell into the rotating saw blade and were cut a second time which consumed unnecessary power and wasted part of the cut trees. There was a noticeable shortage of power to properly drive the saw blade at a consistent high cutting speed. As a result, the saw blade cutting speed slowed down to unacceptable levels while cutting through the trees.

EXAMPLE 2

The same apparatus described in Example 1 above was used except that the direction of rotation of the saw blade was changed to clockwise. The power available to drive the circular saw blade was up slightly because no jamming against the guard occurred. However, some of the cut trees were thrown forward into the tree face and did not topple rearwardly in a substantially parallel and aligned manner.

EXAMPLE 3

The same apparatus as described in Example 1 above was used, except the following modifications were made. An angled guard was installed extending from more or less the center of rotation of the circular saw blade to the guard located between the saw blade and the power wagon. This angled guard reduced the jamming tendency. The cutting blade was driven at a rotational speed of about 813 rpm. The power wagon was pulled with an auxillary tractor (a Clark Skidder powered by a 4-53 G.M. motor) in order to enable more power from the power wagon to be directed to driving the saw blade. Notwithstanding these modifications, there was still a noticeable power shortage and the saw blade speed was reduced to unacceptable low and inefficient levels when cutting through the trees.

EXAMPLE 4

The same apparatus as described in Example 3 above was used except the cutting teeth on the saw blade were modified to cut a kerf through the trees measuring about 2¾ inches rather than 4½ inches. The reduction in the size of the kerf cut produced a noticeable reduction in power requirement. A rear skid was also added at the back of and below the saw blade. The addition of the rear skid seemed to help prevent the saw blade periodically dipping into the dirt, thereby unnecessarily consuming power and also dulling the teeth of the saw blade. Two passes, each measuring 330 feet were made using this equipment. On the first pass thirty-six trees were cut in approximately ninety seconds. The trees toppled in a substantially parallel manner. On the second pass, twenty-four trees were cut in approximately seventy-five seconds. Calculations indicated that at these rates, about forty-eight and thirty-eight cords of wood per hour respectively could be cut.

EXAMPLE 5

Apparatus substantially the same as described in Example 4 was again tested. However, the cutting means was mounted on a 1000 HYDRO-AX power wagon manufactured by National Hydro-Ax, Inc., Owatonna, Minn. 55060. This model of power wagon was capable of delivering about 225 horsepower to the saw blade, that is, about double the power available in the previous examples.

The power wagon was fitted with a circular saw blade measuring about five foot six inches in diameter, an accumulator and a lifter. A swath about four feet wide was cut through the stand of trees. The circular saw blade had a total of 80 teeth made up of 40 lower saw teeth in pairs and 40 upper saw teeth in pairs. This blade cut a kerf through the trees of about 2¾ to 3 inches in height. The circular saw blade was driven in a counterclockwise direction at a rotational rate of about 900 rpm.

Three successive passes were made through one side of a stand of trees in a period of thirteen minutes forty-five seconds. During this time, 199 trees were cut comprising approximately 6½ cords of wood.

When the cutting apparatus was driven alongside the tree face at a rate of about two miles per hour, the cut trees toppled rearwardly in a substantially parallel manner. The trees were collected by the accumulator mounted on the saw blade attachment and were deposited periodically on the ground by means of a lifter.

The bunches of cut trees were removed from the cutting path by a front-end loader equipped with a grapple for clasping and picking up trees. The front-end loader working at top speed was hard pressed to remove the trees that were being cut along the swath in time for the cutting apparatus to make the next pass.

It is to be understood that the foregoing description and the examples are directed only to certain embodiments of the invention. Many other embodiments of the invention are possible by making technical design changes and substitutions which fall within the scope of the invention. These other embodiments are intended to come within the scope of the invention as defined in the following claims.

What is claimed is:

1. A method of continuously felling trees comprising the steps of:

moving a power driven tree cutting means along a path through a stand of trees by means of a mobile power unit;

severing trees with said tree cutting means in said path from their root portions in a plane substantially parallel with the ground as said tree cutting means moves continuously forwardly along said path;

applying a force with said tree cutting means on the butt ends of the cut trees to move the butt ends forwardly in the direction of travel of the mobile power unit, said force being of sufficient magnitude so as to move the butt ends of the trees forwardly at a rate which causes the bodies of the severed trees to fall rearwardly in a substantially parallel direction along the path of movement of said mobile power unit; and successively snagging the base ends of a plurality of successively cut trees and pulling said snagged ends forward with said cutting means until a bunch of cut trees has been formed, and then dropping each resulting bunch.

2. A method of continuously felling trees comprising the steps of:

moving a power driven tree cutting means along a path through a stand of trees by means of a mobile power unit;

severing trees with said tree cutting means in said path from their root portions in a plane substantially parallel with the ground as said tree cutting means moves continuously forwardly along said path;

applying a force with said tree cutting means on the butt ends of the cut trees to move the butt ends forwardly in the direction of travel of the mobile power unit, said force being of sufficient magnitude so as to move the butt ends of the trees forwardly at a rate which causes the bodies of the severed trees to fall rearwardly in a substantially parallel direction along the path of movement of said mobile power unit; and a cover means over lies the tree cutting means immediately adjacent thereto and contacts the butt ends of the severed trees after said upper surface of said cutting means to assist in moving the butt ends of the severed trees forward along the path of movement of the mobile power unit.

* * * * *